United States Patent [19]

Claxton

[11] 4,016,711
[45] Apr. 12, 1977

[54] VINE-FRUIT HARVESTING MACHINE WITH INCLINED-TIP STRIKER RODS

[75] Inventor: Gerald L. Claxton, Fresno, Calif.

[73] Assignee: Up-Right, Inc., Berkeley, Calif.

[22] Filed: June 9, 1975

[21] Appl. No.: 585,103

[52] U.S. Cl. .................................................. 56/330
[51] Int. Cl.² ......................................... A01D 46/00
[58] Field of Search .............................. 56/330, 29

[56] References Cited

UNITED STATES PATENTS

| | | | |
|---|---|---|---|
| 3,439,482 | 4/1969 | Orton | 56/330 |
| 3,611,689 | 10/1971 | Patzlaff | 56/330 |
| 3,613,343 | 10/1971 | Sagouspe | 56/330 |
| 3,685,266 | 8/1972 | Mohn et al. | 56/330 |
| 3,688,482 | 9/1972 | Horn | 56/330 |
| 3,911,653 | 10/1975 | Burton | 56/330 |

Primary Examiner—Russell R. Kinsey
Attorney, Agent, or Firm—Phillips, Moore, Weissenberger, Lempio & Majestic

[57] ABSTRACT

In a mechanical harvesting machine having horizontal striker rods, each of which is secured at one end to a vertical oscillating shaft, the improvement whereby the rod tips which strike the vine are inclined outwardly from the rod, away from the longitudinal centerline of the machine, thereby enabling the vertical shafts to be widely spaced to increase the angle of the rods to the centerline so that the striking contact of the rods on the vines is predominantly by the inclined tips rather than by the sides of the rods. The rods are resilient and the tips are weighted so that the tips will flex in and out of the vine when the shafts are oscillated to deliver a series of localized impulses to the fruit on the vine.

10 Claims, 9 Drawing Figures

FIG_4

FIG_5

FIG_6

FIG_7

FIG_8

FIG_9

VINE-FRUIT HARVESTING MACHINE WITH INCLINED-TIP STRIKER RODS

BACKGROUND OF THE INVENTION

This invention relates to mechanical grape harvesters. The removal of fruit from the area of the head of the vine and the cordon wire area (at the centerline of the row) is one of the most difficult tasks in machine harvesting. All of the foliage and growth of the vine must be penetrated to achieve this. In the area of the head of the vine (the normally relatively massive area at the top of the trunk from which the fruit-bearing canes originate) removal of cane pruned grapes is especially difficult. Wood growth of 6 to 8 inches on either side of the row center is not unusual. Some vineyards have massive growth to an overall width of 20 to 30 inches, which precludes machine harvesting without cutting back the wood beforehand.

A very large number of the more popular wine grape varietals have a very large percentage of grape production in the area immediately adjacent the vine head and the cordon wire. This can result in 60–80 percent of the crop being within 4 to 6 inches of the row centerline, with 20–30 percent along the center. In order to achieve a high percentage of fruit removal it is necessary to have very good coverage of the area immediately adjacent the row centerline and the vine head.

Another characteristic of the majority of wine grapes is the extreme difficulty or impossibility of removal of fruit in the vine head and cordon wire area by shaking. The grapes are simply too entwined and can only be removed completely by direct contact.

A satisfactory harvesting of the fruit in the vine head or cordon area is therefore dependent on complete penetration of the rod into this area in an even and consistent manner. In order to avoid damage to the vine structure and to avoid excessive leaf removal, a minimum disturbance of this area is necessary.

The type of mechanical grape harvester is most widespread use is the striker rod machine, as exemplified in Horn U.S. Pat. No 3,688,482, issued on Sept. 5, 1972. Such machines have a plurality of oscillating vertical shafts, each shaft having a plurality of generally horizontal, elongated straight striker rods, each mounted at one end to the shaft for oscillation thereby. As the harvester moves along a row of fruit-bearing vines, the oscillation of the shafts causes the striker rods to swing repeatedly into and out of striking engagement with the fruit of the vines so as to dislodge the fruit from the vines.

Whether the straight striker rods shown in the Horn patent have been mounted as shown in either FIG. 3 or FIG. 4 thereof, it has been necessary to orient the rods at a relatively small angle — typically as shown in FIG. 2 of the Horn patent — to the centerline of the vine row.

Extensive harvesting experience has proven that, as compared to the previously conventional form of mounting shown in Horn FIG. 3, the resilient striker rod mounting of Horn FIG. 4 significantly reduces flexure strain and fatigue failure at the mounting end and reduces damage to the vines and posts struck by the striker rods. The use of the thin metal sleeves on the free end of the rods has also reduced splintering of the rod. However, such experience has also shown that the Horn striker rods have not been fully satisfactory in harvesting efficiency, for the reasons set forth in more detail below. Nor has experience been satisfactory with oscillating paddles or panels, similarly oriented to the vine, with or without the inwardly projecting hooks or other members, as for example disclosed in U.S. Pat. No. 3,439,482, issued on April 22, 1969 to Orton.

Such picking devices, and their narrow-angle orientation of the strikers to the centerline of the vine, have a number of serious faults:

a. In order to achieve the necessary penetration of the rod ends into the vines, a substantial length of the rod will strike sidewardly against the foliage of the vine and dislodge many leaves while striking and removing the grapes. These leaves then mix with the harvested fruit on the conveyors of the harvesting machine. Although most of these leaves can be removed with blowers, the juice entrapped on the leaves will be lost.

b. Inwardly projecting hooks or other members fastened to the striker rods, paddles or panels in an attempt to provide better vine penetration will rake the vine, macerating the fruit and removing and fragmenting excessive leaves. The faster the ground speed of the harvester — for maximum harvester production — the more deleterious is this raking action.

c. The ends of the straight rods or paddles cut canes, leaves and fruit, causing vine damage, lowered fruit quality, and juice loss.

d. Because of the narrow angle of the rod or paddle to the centerline of the vine, it is difficult for the rod or paddle end to penetrate the head of the vine (the region at the top of the vine trunk where the canes, arms or cordons branch out). As a consequence, fruit removal from the head of the vine is incomplete and a harvest loss is incurred. This is particularly so with tough-stemmed varietals of grapes.

e. Because of the cushioning effect of the vine growth a very rapid oscillation of the rods has been necessary for the rods to penetrate the vines and impact against the grapes with sufficient force to remove the grapes. This has been particularly so for the harvesting of tough-stemmed grape varietals. Frequencies of 400 to 450 cycles per minute, resulting in impacts every 1½ to 2 inches along the vine, are commonly used. The attendant high rod tip speeds and repetitive striking of the vine results in damage to the vine and leaf removal which is undesired but unavoidable if the variety is to be harvested.

With a significant number of tough-stemmed varietals (e.g., Ugni Blanc, Zinfandel and Emerald Riesling), the problem is compounded by the thin-skinned, easily damaged character of the grape. Other varietals, such as Carrignan, have extremely brittle wood which is very susceptible to cane damage. These varietals have generally been considered as unsuitable for machine harvesting.

f. On most vinifera grapevines the fruit is too tough-stemmed to be removed by shaking the vine. Removal will only occur if the vines are penetrated and the fruit is struck. With multiple, narrow-angle rods on each side of the vine and with the conventional narrowly spaced oscillatory shafts on which these rods are mounted, an occasional bushy vine is so embraced by the rods that it will oscillate side-to-side in synchronism with the rod action and the rods do not penetrate the vine to strike and remove the fruit therefrom.

Such vine oscillation has also been observed in the harvesting of varieties such as Thompson Seedless having a relatively high yield and pendulous, free-hanging clusters. The vine oscillation has occurred at random intervals for distances of 40 to 50 feet in some fields. Thompson Seedless yields 60 to 80 pounds of fruit per vine and with a 10-foot spacing a loss of picking effectiveness in 40 to 50 feet of a row can result in a loss of 300 to 400 pounds of fruit for each occurrence.

g. Wide crossarm trellises are often used for foliage support to shade the fruit underneath from sunburn. Such trellises cannot be straddled by a harvester machine having the conventional narrow spacing between the opposed oscillating strike arm shafts.

Attempts have been made to overcome some of these problems by moving the oscillating shafts further apart, thereby increasing the angle of the rods or paddles to the centerline of the machine. These attempts have generally been unsatisfactory. As the oscillating rods are moved along the row by the harvesting machine the tips of the rods will penetrate and strike the vine at one point along its length. The rods will then be removed from the vine to penetrate the vine again, on the next cycle of oscillation at another point along the vine. With the same ground speed and same oscillation frequency, more of the vine will be skipped with a greater rod inclination and the amount of grapes left unharvested will increase. The amount of skipping can be reduced by reducing the ground speed of the harvester while using the same oscillation frequency. This, however, reduces the rate of harvesting production correspondingly. The amount of skipping can also be reduced without a reduction in ground speed by increasing the oscillation frequency. This too is disadvantageous since the kinetic energy of the striker rods varies as the square of their speed and even a small increase in speed of oscillatory movement beyond that necessary to pick the fruit will result in substantial damage to the vines and fruit and to the striker rods. Then again, the ground speed can be reduced and the oscillation frequency increased to reduce the degree of skipping. This too is disadvantageous since the rate of harvest production will go down while the amount of damage increases.

It is the principal object of this invention to overcome the above-enumerated faults of present harvesting machines and provide a machine capable of successful harvesting on a commercial scale with widely spaced oscillating striker rod shafts and a large angle between the striker rods and the longitudinal centerline of the machine.

It is a further object of this invention to provide such a machine in which the ground speed can be increased and/or the oscillation frequency reduced, as compared to conventional machines, without a corresponding loss in picking efficiency.

SUMMARY OF THE INVENTION

The objects of the present invention are met by providing striker rods which are normally straight throughout the major portion of their length, the rods being mounted to the oscillating shafts for oscillation thereby, the rods being mounted so that they cannot rotate about their longitudinal axes. The free end, or tip, of a rod is inclined rearwardly from the major length portion and at an angle of more than 180° therefrom on the side of the rod facing the centerline of the vine so that the rod will have a relatively small length thereof (the tip portion) which comes into contact with the fruit, with a relatively even distribution of force or pressure along that length. This is in contrast to the presently used straight rods which may also have a relatively small portion in actual contact with the fruit during harvesting, but which have a very uneven force or pressure distribution therealong, with an extremely high force concentration at the extreme end diminishing to zero at the outer extreme of the engaging portion.

The major length of the rod is flexible and the inclined tip is weighted so that during oscillation there will be a substantial flexing movement of the tip of the rod, the tip moving through a substantially greater arc than the arc of oscillation of the shafts as the rod tip penetrates into the vines and then moves outwardly therefrom. With such an arrangement the oscillating shafts can be moved further from the centerline of the machine while yet providing a series of generally transverse penetrating and imparting impulses to the vine and fruit thereon without appreciable skipping as the machine progresses along the row.

Other objects and advantages will become apparent during the course of the following detailed description.

BRIEF DESCRIPTION OF THE DRAWINGS

In the drawings forming a part of this application, and in which like parts are designated by like reference numerals throughout the same.

DESCRIPTION OF THE PREFERRED EMBODIMENT

Figure 1:
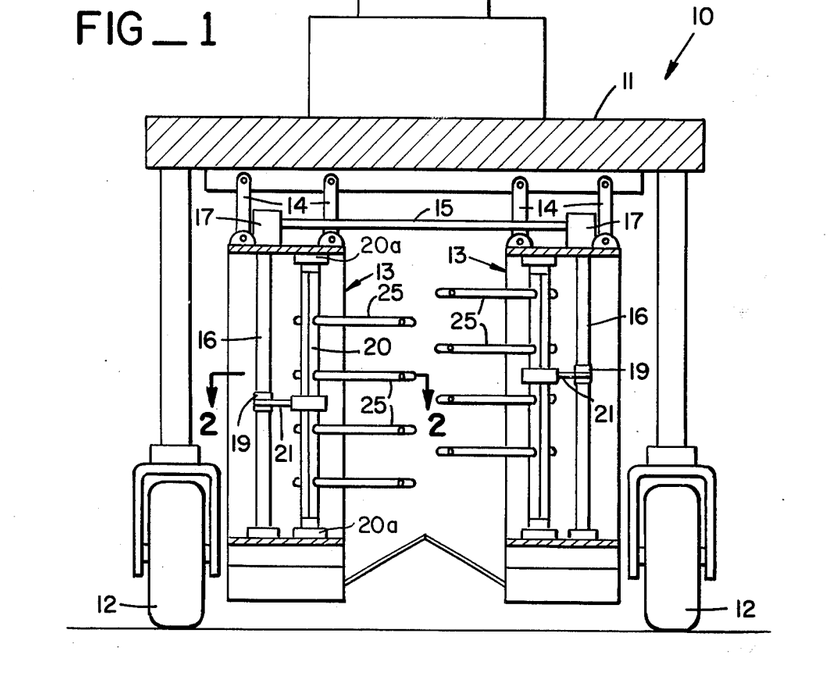
FIG. 1 is a rear elevational view of a vine harvester equipped with the striker rods of the present invention.

FIG. 1 depicts a harvesting machine 10, having an inverted-U frame 11 mounted on wheels 12, adapted to straddle and move along a row of vines. The frame 11 carries a picking mechanism 13 on each side of the longitudinal centerline of the machine, the mechanism 13 being suspended by links 14 and tied together by crossbar 15 so that the picking mechanisms may swing laterally and as a unit, and remain centered on the vine in spite of minor errors in direction by the driver or tilting of the machine due to unevenness of the ground. Each picking mechanism 13 has a vertical drive shaft 16 powered by motor 17. Rotation of the drive shaft will rotate the eccentric 18 fixed thereto to cause a generally reciprocatory movement of link 19. Also carried by the picking mechanism 13 is the vertically mounted striker rod support shaft 20 which is rotatably journaled in bearings 20a on picking mechanism 13 and has a laterally extending rock arm 21 fixed thereto, the rock arm being pivotally connected to link 19. Each full revolution of drive shaft 16 will thus cause one full cycle of oscillation of shaft 20, the degree of arcuate movement of shaft 20 during oscillation being dependent upon the eccentricity of eccentric 18 and the length of rock arm 21. Typically, shaft 20 will oscillate through an arc of about 10°.

A plurality of striker rods 25 are mounted on each shaft 20 at vertically spaced locations. Preferably shaft 20 has a plurality of rigid tubular holders 26 welded thereto, each holder extending completely through the shaft and projecting from each side thereof. A resilient sleeve 27, such as rubber hose, is disposed within the holder and surrounds the end of the striker rod 25 mounted therein. The rod 25 is secured to the holder by bolt 28 and is held by bolt 28 against axial movement or rotation about its longitudinal axis. The striker rods extend generally horizontally from shaft 20 rearwardly therefrom and inwardly towards the longitudinal centerline of the machine.

Each striker rod 25 is normally straight throughout the major portion 30 of its length and is made of resilient material. Preferably the straight portion 30 is made of fiber glass, such material having the desired strength and resiliency for the present purpose.

Figures 2, 3:
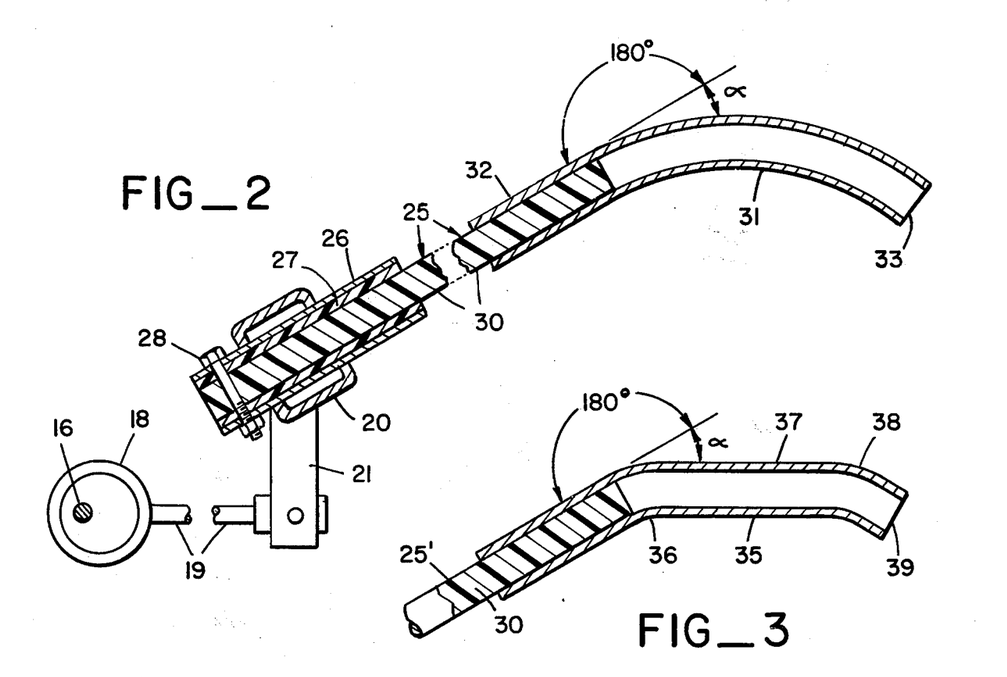
FIG. 2 is a sectional view on an enlarged scale, taken on line 2—2 of FIG. 1, illustrating the striker rod and the manner in which it is mounted, the striker rod having an inclined tip which is curved throughout its length.
FIG. 3 is a sectional view of a modification of the striker rod, illustrating a striker rod having an inclined tip which is straight throughout most of its length.

The tip of the striker rod 25 comprises a metal sleeve 31 connected to the end of the fiber glass rod 30 and extending therefrom. One end 32 of sleeve 31 encircles the end of rod 30 and is bonded thereto, as by epoxy resin. In the modification of FIG. 2, sleeve 31 is smoothly curved throughout its length and terminates at 33 to form the extreme tip of the rod. In the modification of FIG. 3, striker rod 25' has a metal sleeve 35 which is more sharply bent at 36 and has a straight length 37, the sleeve again being bent at 38 near the end 39 of the sleeve.

In either event, the tip of the striker rod will have an elongated surface facing inwardly towards the longitudinal centerline of the machine and which is inclined away from the straight portion 30 of the striker rod at an angle $\alpha$ more than 180° on the side of the striker rod towards the longitudinal centerline of the machine. If the angle $\alpha$ is equal to the angle between the striker rod and the longitudinal centerline of the machine when the striker rod is closest thereto during oscillation, the inclined tip will accordingly have an appreciable length substantially parallel to the centerline at such time so that when the inclined tip comes into contact with the fruit at the centerline the striking force will be evenly distributed along the length of the tip.

One striker rod configuration 25 which has been successfully tested utilized a standard solid fiber glass rod three-fourths inch in diameter, weighing about 1 pound and with about 40 inches from the pivot centerline (rock shaft 20) to its end. The tip member 31 was an 8-inch long piece of seven-eighths inch diameter and 0.058-inch wall steel stell tubing weighing about 0.33 pound, the tip having a 3-inch long straight portion bonded to the end of the fiber glass rod, the remainder of the tip being bent with a 6-inch radius of curvature. These parameters are set forth merely by way of example and are not intended to represent the only parameters which will accomplish the results sought and described herein. The overall length of the tip should be sufficiently short so as to minimize overlap of successive strokes of the tip when contacting the fruit. At the same time it should be long enough to impart the desired additional weight to the end of the rod and to provide for adequate coverage of the fruit so as to prevent skip zones as the machine travels along a row of vines.

The continuously curved tip 31 will inherently provide somewhat more skip than the straight bent tip 35, when the striker rod is set so that the straight portion 37 is parallel to the longitudinal centerline on its inward swing. However, the continuously curved tip is advantageous in that it will retain the same contact area regardless of the angle relative to the row, and it will always present a relatively smooth surface to the vine at the highest pressure area. The use of a continuously curved tip also results in the extreme end 33 thereof being inclined outward of the central portion so as to minimize cutting of the vines. The additional bend 38 of tip 35 is also made for this purpose.

Figure 4:
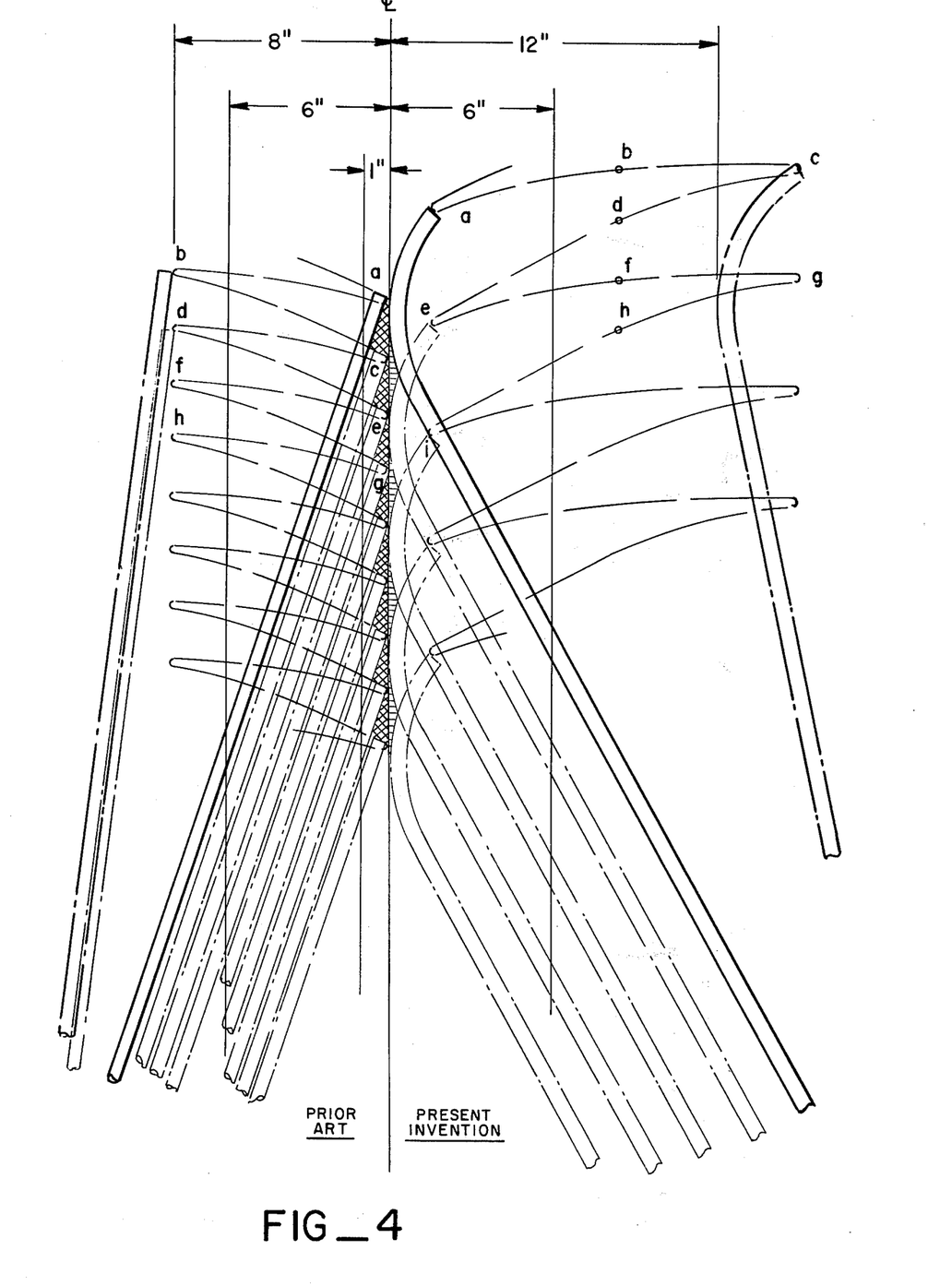
FIGS. 4—9 are plan view diagrams comparing harvesting operations carried out with a conventional straight striker rod and with a present curved-tip striker rod.

FIG. 4 illustrates the operation of a conventional straight striker rod system and the present inclined-tip striker rod system, using a continuously curved tip (these being shown on the left and right side of the centerline respectively) when set for operation as required for the satisfactory harvesting of a typical vineyard. The straight-rod system would be set to oscillate the rods at 400 rpm and at a ground speed of three-fourths mph. The curved-tip rod system would be set to operate at 350 rpm and a ground speed of 1¼ mph. Although the arc of oscillation of the rock shaft is the same, the weighted curved tip of the present rod will move through 12 inches as compared to an 8-inch tip movement of the straight rod.

Operation will result in an impact spacing along the row of 2 inches for the straight rods and 4 inches for the curved-tip rods. The path of the tip of each rod is shown and lettered to indicate relative successive positions of the tips. When the curved tip is at a, the straight tip is at $a$; when the curved tip is at $b$ the straight tip is at $b$; etc. The shaded area represents the lack of coverage for the curved-tip rod, and is about 1.3 percent of the first 6 inches of fruiting area. The cross-hatched area represents the lack of coverage for the straight rods, about 5.5 percent of the first 6 inches. It is evident that the coverage for the curved-tip rod is significantly better than that of the straight rod.

It is also apparent from FIG. 4 that the straight tip has entered the vine area twice for the same area in which the curved tip has entered once. Thus, with a straight-rod system, the outer foliage of the vine is subjected to more impacts, which wastes energy and results in more leaf removal.

Figure 5:
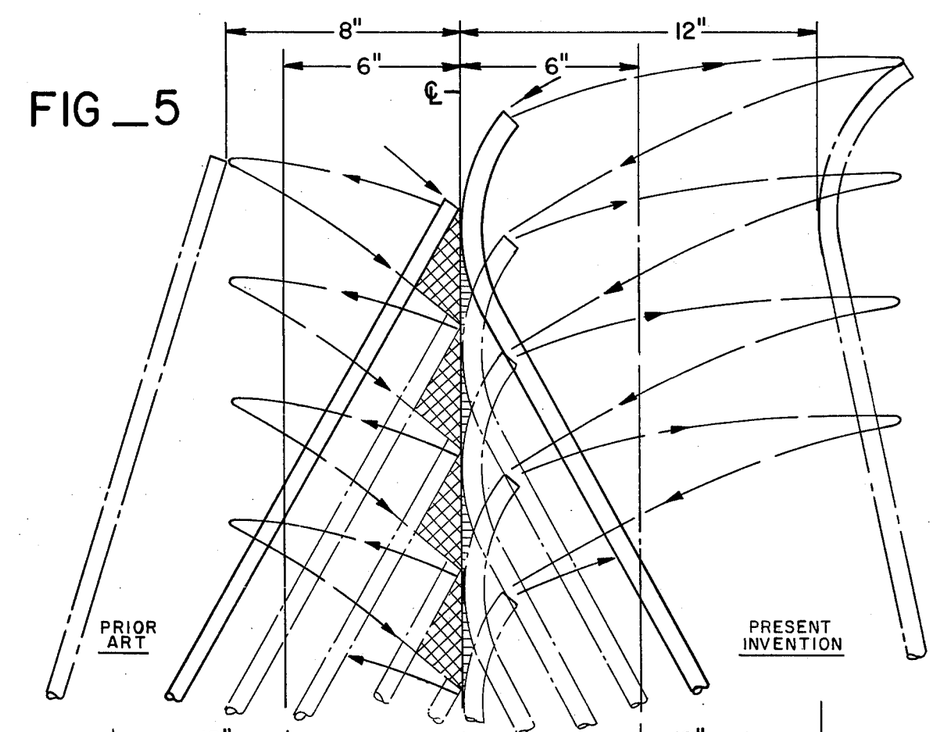

FIG. 5 represents the action of a straight rod if it were to be set at the same angle with respect to the centerline and operated at the same rate (350 rpm and 1¼ mph) as used with a curved-tip rod system. The reason these operating conditions have not normally resulted in satisfactory fruit removal is evident. The curved-tip rod shown on the right has an area which is not struck by the rod of 1.3 percent of the first 6 inches of fruiting area. The straight-tip rod would now have an area left untouched of 13.3 percent of the first 6 inches. This difference represents a significant amount of fruit left unharvested.

Figure 6:
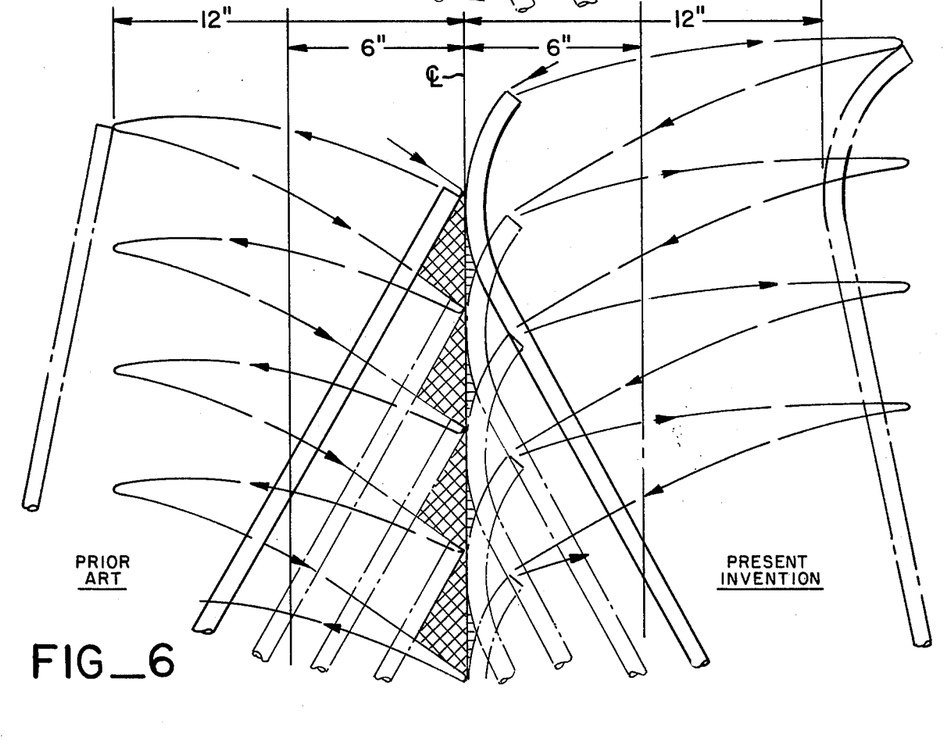

FIG. 6 represents the action of a straight rod which is operating under the same conditions as the curved-tip rod, including the addition of the same weight at the end. The area left untouched is independent of the distance the rod swings away from the centerline and so remains at the 13.3 percent of FIG. 2. The area left by the curved-tip rods is again 1.3 percent. Again, straight rods would leave a significant amount of fruit unharvested.

Figure 7:
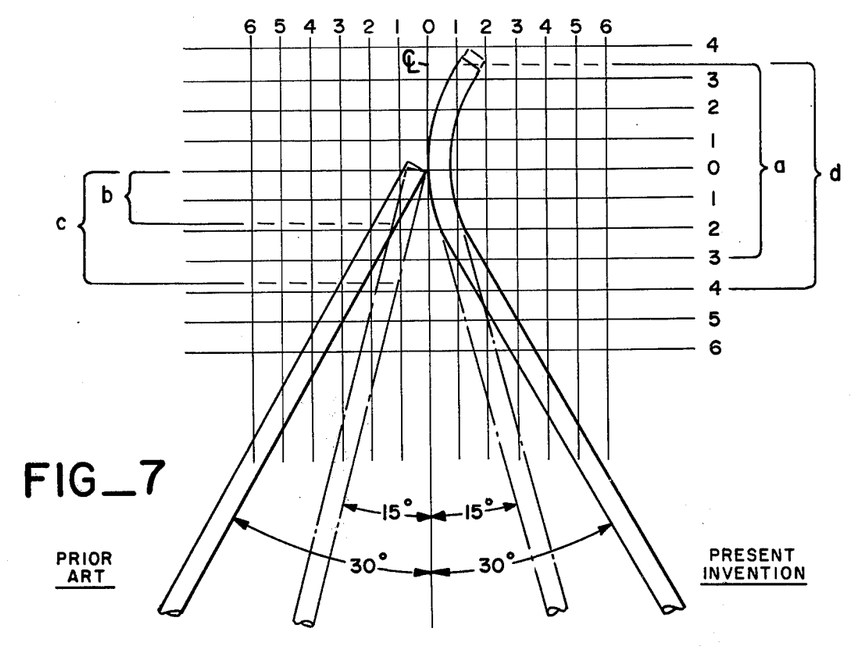

FIG. 7 illustrates a further advantage of the curved-tip system. Although the straight rods are usually used at a 15°–20° inclination, they can be used at a 30° angle. Similarly, the curved-tip rod is designed to be used at a 30° angle but it could be set and used at a 15° angle.

FIG. 7 shows both rods at 15° and 30° angles. A series of lines parallel to the row center has been drawn. It is apparent from a direct comparison that the length of rod extending inside each successive line (generally representing the length of rod contacting the grapes located inside that distance) is significantly greater for the curved-tip rods than the straight rods. In addition, as the angle of the rod is increased from 15° to 30° the length of contact for the straight rods decreases dramatically. Referring again to FIG. 4, it can be seen that the untouched area for the straight rods lies well within a line 1 inch from the center. Using this line for comparison, it can be readily seen that the change in contact length within this area for the straight rods varies from about 1¾ inches $b$ with a 15° inclination to about 3¾ inches $c$ with a 30° inclination. Thus, increasing the angle from 15° to 30° results in a 53.3 percent reduction in striking length within the 1-inch zone. The corresponding contact length for the curved-tip rod varies from 7½ inches $d$ at 15° to 6½ inches $a$ at 30°, only a 13.3 percent reduction. Referring again to FIG. 4, it is obvious that any force imparted by the tip of the rod to the vine is distributed over a much greater length in the case of the curved tip than in the case of the straight tip. This is very important in preventing vine damage. In all varieties, excepting very young vines, the force required to penetrate the foliage is very much higher than that required to actually remove the grapes. If the impact on the canes occurs at a distance removed from the center of the row (the point of origin of growth, or base, of the cane) there is sufficient flexibility of the cane to avoid serious damage. If, on the other hand, the contact of the rod with the cane occurs near the base (within 2–4 inches) the cane is often broken off due to the lack of flexibility. If this force can be distributed along enough length to ensure that contact with other grapes and canes will cushion the blow, serious cane damage will be avoided. Generally fruiting canes occur every 3 to 6 inches along the wire. It can be seen that the use of the straight rod will inherently cause damage due to the concentration of force applied by the end of the rod, if the angle exceeds 15° to any great extent. The curved-tip rod has a sufficient contact length to minimize this problem and can be set at any angle from 15° to 30° without significantly reducing this distribution.

Figure 8:
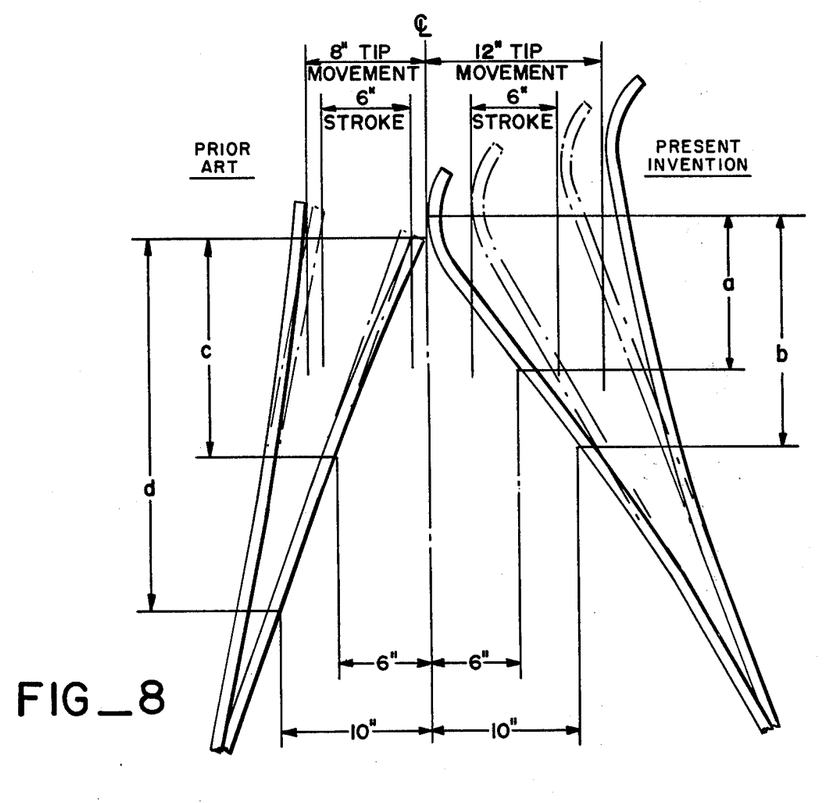

There is a secondary effect which is caused by the increased weight of the tip. FIG. 8 illustrates the rod position and shape at each end of the stroke for a straight rod at a normal angle of 20° and a curved-tip rod at a normal angle of 30°. The solid lines show the position with normal rod flexure. The phantom lines indicate the limits of an inflexible rod. The straight rod has a normal movement of 6 inches, which is increased to 8 inches by the inertia of the rod at each end of the stroke. The curved-tip rod has a normal movement of 6 inches, which is increased to 12 inches by the inertia of the rod and the weight of the tip at the end of each stroke. Although this increase in stroke is dependent on the stiffness of the rod, the weight of the rod and tip and the rpm of the unit, the values shown here are typical of the system currently in use by the majority of harvesting machines. The values given for the curved-tip rod are those observed for normal operation. The specific values shown for the curved-tip rod may not be the most ideal, as more extensive field testing may yield even more improvement for other values.

It may be seen that, relative to leaf removal and cane damage, the normal undeflected movement of the straight rod only allows a path 2 inches wide without bending the rod outward with an extreme width of 16 inches at the extreme of the stroke. The curved-tip rod will, on the other hand, have a path width of 6 inches at the inward undeflected point with a maximum clearance of 24 inches at the outer extreme of the stroke. In all cases there is more room physically for the vines to pass between the curved-tip rods than the straight rods.

FIG. 8 also illustrates that the curved-tip rod at its 30° angle has less length in contact with the vine foliage. Taking comparative distances outward, at 6 inches outward (generally the most dense part of the vine) the curved-tip rod has an extension into that area of 10 inches $a$ whereas the straight rod has an extension into that area of 14 inches $c$. The vine canopy (leaves, etc.) will normally be about 20 inches wide on all but the very young vines. The extension inside the 10-inch line for the curved-tip rod if 15 inches $b$ and for the straight rod is 25 inches $d$. In all cases this is measured from the point of impact of the rod tip with the centerline which is a reasonable measure of the foliage newly struck by each subsequent stroke of the rod. If the length utilized at the tip for picking the most dense grape area is considered the only productive portion of the rod relative to picking grapes, then any other portion striking the vines, leaves, trunks, etc. must be considered nonproductive. In other words, any energy expended in passing the non-productive portion of the rod through the vines, leaves, etc. must be considered wasted as well as producing unnecessary damage. Referring again to FIG. 7, it can be readily seen that the productive area of the curved-tip rod is much greater than that of the straight rod. It has been noted in FIG. 8 that the straight rod has a greater length contacting the vines, leaves, etc. (non-productive) than the curved rod. It is clear that there is much less wasted and damage-causing energy imparted to the vines and leaves with the curved-tip rod. This is not including the additional factor of the greater frequency required with the straight rods which elements taken together result in 2 to 3 times the wasteful and damage-producing energy applied to the vine by the straight rod compared to the curved rod. Referring again to FIG. 8, it can be seen that the last 3 inches of inward stroke of the heavier curved-tip rod is not due to the movement as governed by the geometry of the actuating system but is due solely to the inertia of the rod. In the case of the straight unweighted rod this inertial motion is only 1 inch. Therefore, the impact of the weighted curved-tip in the heavy fruiting zone near the center is largely the resultant of the energy placed into the rod movement during the preceding portion of the stroke. The driving mechanism is therefore not as subject to the sudden shock loading caused by the impact of the rod tip with the fruit or trunk area, a matter of especial significance at the times during which the rods pass over the trunk of the vines or over posts and stakes. The straight rods must apply a force to the vine at the inner extreme of the stroke derived largely by energy supplied by the driving mechanism at the exact moment.

Figure 9:
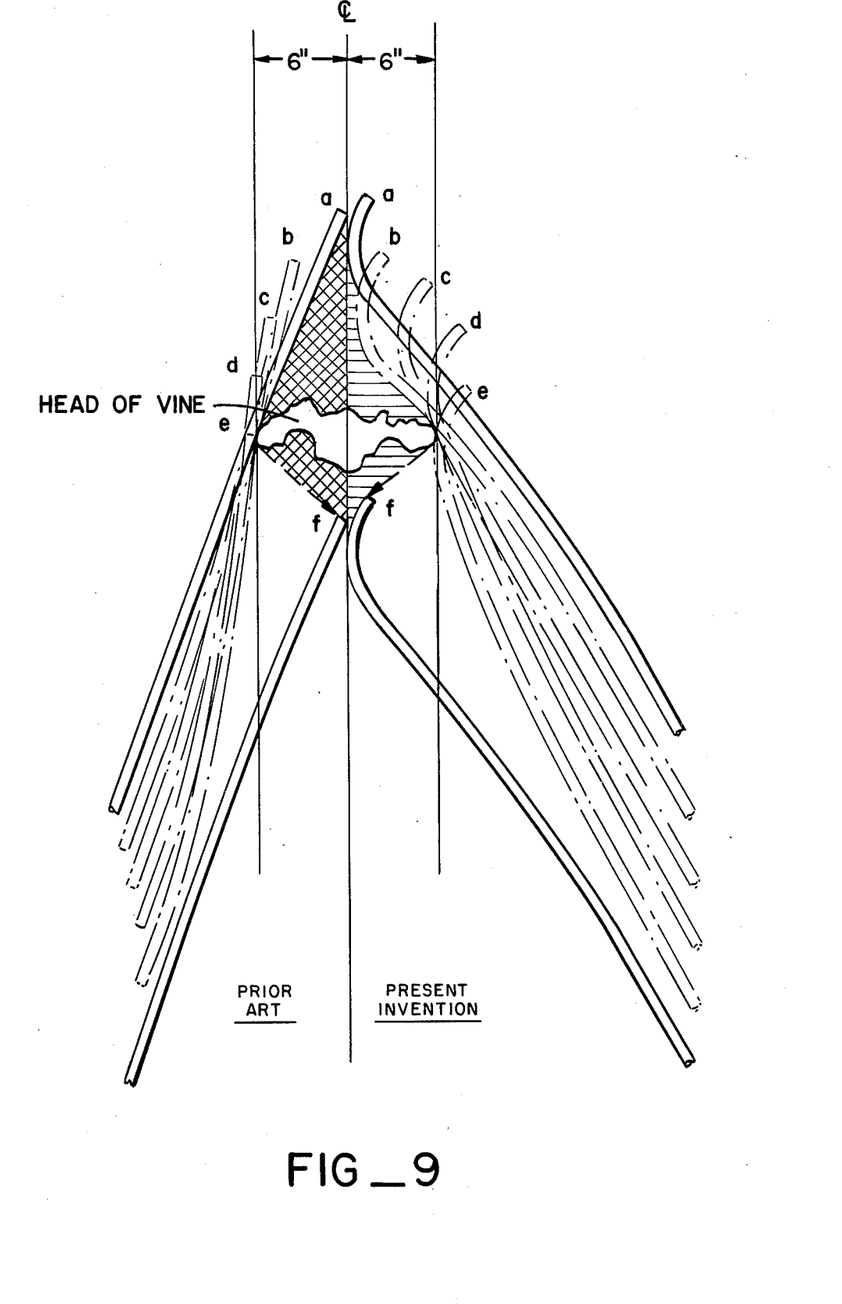

Although some of the advantages of the weighted curved tip discussed above in connection with FIG. 8 could be achieved by using a straight weighted tip on a conventional straight rod, the straight rod would still have the disadvantages described in connection with FIGS. 4 through 7. FIG. 9 illustrates the effectiveness of fruit removal at the vine head area by straight rods versus curved-tip rods when set at an angle for operation under normal field conditions. Each sequential rod position indicates the shape and position of the rod at the extreme inward limit of travel.

Vines are usually planted at 10- to 12-foot intervals with fruit canes trained along a wire between each vine. The necessity for setting a straight striker rod at 15–20° in order to maximize fruit removal and minimize vine damage in the space between each vine results in a much reduced performance in the area of the trunk and head of the vine. Due to the inertia of the weighted end and the steeper angle, the curved-tip rod will have a much better fruit removal. The steeper angle allows the end of the rod to penetrate the lined area of FIG. 9 more fully, and penetration is increased somewhat by bending of the rod around the head. The straight rod does not have enough inertia at the end to achieve better penetration, nor does the shallower angle permit as complete penetration.

Due to the initial position and stroke of each type rod (refer to FIG. 8), the straight rod must have an outward deflection of 5 inches at the vine head in order to pass (refer to $e$, FIG. 9) whereas the curved-tip rod need deflect outward only 3 inches. This results in reduced force on the vine from the curved-tip rod. This will also minimize stake breakage which sometimes occurs presently. The high force from the straight rod tends to whip the vine trunk back and forth violently, which in turn causes the stake to which the vine is fastened to do likewise. If the stake is planted deeply and contains minor flaws, it is broken.

With respect to the faults of prior machines previously listed in the Background of the Invention:

a. Leaf removal is minimized since the contact with the vine, on either side, is a series of localized impulse penetrations of the inclined tips of the rods. A lesser amount of the sides of the straight portions of the rods strike the outer parts of the vines.

b. There are no inwardly projecting hooks or other members on the rods to damage the vines or fruit. Instead, the inclined tips of the present rods slant outwardly from the vines and thereby minimize raking of the vines. Such raking is further minimized by the flexural movement of the rods. Since the arcuate amplitude of this flexing action is considerably greater than before, the free ends of the striker rods can be set further from the vine and still reach the centerline. With opposed sets of rods, the distance between the tips can be substantially increased to reduce the squeezing of the vine and the raking thereof.

c. Since the extreme ends of the inclined tips slant outwardly from a point of tangency with the centerline of the vine, there is less cutting of the canes, leaves or fruit by the rods.

d. Because of the use of a wider angle of the rods in relation to the vine, the rod tips penetrate the head of a vine more effectively. Penetration is also aided by the fact that the striking is a series of localized impulses into the vine rather than primarily a spanking of a large lengthwise area of the vine.

e. The rate of oscillation can be reduced without decreasing harvesting efficiency. Zinfandel, Ugni Blanc, Emerald Riesling and other tough-stemmed, thin-skinned grape varietals can now be commercially harvested by machine, as can brittle-wooded Carrignan grapes.

f. The wide spacing of the oscillating shafts and the consequent larger-angle orientation of the striker rods to the centerlines of the vines made possible by the present invention enhances the harvesting of bushy vines, particularly when suspended and sidewise "floating" picking heads are used. Previously, the floating capability has balanced the dynamic pressure of the striker rods on the opposite sides of the vines. The present inclined-tip striker rod system, when used with floating picking heads, balances the overall opposing impacts of the penetrating striker rods more on the fruit itself, thereby more efficiently removing the fruit. Vine oscillation has not been observed.

g. By use of the present inclined-tip striker rod system, crossarm trellises can be straddled.

Field testing of the conventional straight rod and the present inclined-tip rod systems show the superiority of the present system. Comparison tests have been carried out in a vineyard wherein the grape crop was approximately 8 tons of grapes per acre. A harvesting machine with the conventional straight rod system was operated at approximately five-eighths-acre-per-hour ground speed and at an average 400 impactor rpm. The harvesting machine with a curved-tip rod system was operated at approximately 1-acre-per-hour ground speed and at an average 340 impactor rpm. The results of the tests showed, on a per-acre basis:

|  | Straight Rod | Curved-Tip Rod | Curved-Tip vs. Straight |
|---|---|---|---|
| Time required to harvest one acre | 1.6 hour | 1 hour | 60% less |
| Percentage of grapes harvested | 90–95% | 95–100% | 3–5% more |
| Trash content (primarily leaves) in harvested grapes | 40 lb. | 20 lb. | 50% less |

Thus, the present system will harvest more grapes in a significantly shorter time and will have a significantly lesser amount of trash which must be removed from the harvested grapes.

I claim:

1. In a grape-harvesting machine having a frame adapted to straddle and move along a row of grapevines, a vertical striker rod support shaft carried by said frame at one side of the longitudinal centerline of said machine, an elongated striker rod mounted at one end thereof to said shaft for oscillation of said rod about said one end upon oscillation of said shaft about its vertical axis, said striker rod extending generally horizontally from said shaft and extending rearwardly of said machine and inwardly towards the longitudinal centerline of said machine and having an elongated tip portion at the end opposite from said one end thereof, means for oscillating said shaft at a predetermined rate about its vertical axis and through a limited horizontal arc to move said tip portion to said longitudinal centerline of said machine and away therefrom during each cycle of oscillation of said shaft, and means for moving said machine forwardly at a uniform speed such that said machine moves forwardly a predetermined distance during each full cycle of oscillation of said shaft, the improvement comprising:

means preventing rotation of said rod about its longitudinal axis, said rod being normally straight throughout the major portion of its length and said straight portion thereof being made of resilient material, said elongated tip portion of said rod extending from said major portion thereof, said tip portion being generally horizontal and being inclined to said major portion at a horizontal angle on the side of said rod towards the longitudinal centerline of said machine equal to approximately 180° plus the angle between said longitudinal centerline and said straight portion of said rod when said tip portion is at said longitudinal centerline, said tip portion having a length substantially equal to said predetermined distance that said machine moves forwardly during a full cycle of oscillation of said striker rod support shaft.

2. Apparatus as set forth in claim 1 wherein said tip portion is substantially heavier per unit of length than said major-length straight portion.

3. Apparatus as set forth in claim 1, wherein said straight portion of said striker rod comprises a solid fiberglass rod.

4. Apparatus as set forth in claim 1 wherein said inclined tip portion is smoothly curved from the end of said straight portion of said rod to the end of said tip portion.

5. Apparatus as set forth in claim 1 wherein said inclined tip portion of said rod is straight throughout most of its length.

6. Apparatus as set forth in claim 1 wherein said tip portion of said striker rod is substantially heavier per unit of length than said straight portion and wherein said major length portion of said striker rod comprises a solid fiberglass rod having sufficient resilience such that the degree of total arcuate travel of said tip portion during oscillation of said support shaft at said predetermined rate is substantially greater than the degree of said limited horizontal arc of oscillation of said shaft.

7. Apparatus as set forth in claim 1 wherein said straight portion of said striker rod comprises a solid fiberglass rod, wherein said tip portion is substantially heavier per unit of length than said fiberglass rod and wherein said fiberglass rod has sufficient resilience such that the degree of total arcuate travel of said tip portion during oscillation of said support shaft when said predetermined rate of oscillation is about 350 cycles per minute is in the order of twice the degree of said limited horizontal arc of oscillation of said vertical support shaft.

8. Apparatus as set forth in claim 7 wherein said tip portion is smoothly curved from the end of said straight portion of said rod to the end of said tip portion.

9. Apparatus as set forth in claim 1 wherein the angle between said major-length straight portion of said striker rod and said longitudinal centerline of said machine is substantially more than 15° when said tip portion is at said longitudinal centerline.

10. Apparatus as set forth in claim 9 wherein said tip portion is substantially heavier per unit length than said major-length straight portion of said striker rod and wherein said straight portion of said striker rod comprises a solid fiberglass rod having sufficient resilience such that the degree of total arcuate travel of said tip portion during oscillation of said support shaft at said predetermined rate is substantially greater than the degree of said limited horizontal arc of oscillation of said shaft.

* * * * *

UNITED STATES PATENT AND TRADEMARK OFFICE
CERTIFICATE OF CORRECTION

PATENT NO. : 4,016,711
DATED : April 12, 1977
INVENTOR(S) : GERALD L. CLAXTON

It is certified that error appears in the above-identified patent and that said Letters Patent are hereby corrected as shown below:

Column 1, line 40 - after "harvester", "is" should read --in--.

Column 5, line 50 - after "wall", --thickness-- should be inserted and after "steel", "stell" should be deleted.

Column 7, line 15 - after "inches", "b" should read --(b)--;

Column 7, line 16 - after "inches", "c" should read --(c)--;

Column 7, line 20 - after "inches", first occurrence, "d" should read --(d)--; after "inches", second occurrence, "a" should read --(a)--.

Signed and Sealed this twenty-third Day of August 1977

[SEAL]

Attest:

RUTH C. MASON
Attesting Officer

C. MARSHALL DANN
Commissioner of Patents and Trademarks